United States Patent
Kikugawa et al.

(10) Patent No.: US 8,958,277 B2
(45) Date of Patent: Feb. 17, 2015

(54) INFORMATION RECORDING METHOD, INFORMATION READING METHOD, AND OPTICAL DISC DEVICE

(75) Inventors: Atsushi Kikugawa, Tokyo (JP); Tatsuro Ide, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 193 days.

(21) Appl. No.: 13/286,243

(22) Filed: Nov. 1, 2011

(65) Prior Publication Data

US 2012/0134247 A1 May 31, 2012

(30) Foreign Application Priority Data

Nov. 25, 2010 (JP) ................................. 2010-262820

(51) Int. Cl.
*G11B 7/013* (2006.01)
*G11B 7/24* (2013.01)
*G11B 7/00* (2006.01)
*G11B 7/09* (2006.01)
(Continued)

(52) U.S. Cl.
CPC .......... *G11B 7/0901* (2013.01); *G11B 7/24044* (2013.01); *G11B 7/2405* (2013.01)
USPC .... 369/94; 369/275.4; 369/44.37; 369/44.29; 369/44.26

(58) Field of Classification Search
USPC ........... 369/112.01–112.03, 112.16, 112.012, 369/112.17, 44.23, 44.24, 44.41
See application file for complete search history.

(56) References Cited

U.S. PATENT DOCUMENTS 6,288,986 B1 * 9/2001 McDonald et al. ........ 369/44.23
7,170,661 B2 * 1/2007 Ogasawara et al. ............ 359/22
8,305,866 B2 * 11/2012 Tanabe et al. ............ 369/112.23
(Continued)

FOREIGN PATENT DOCUMENTS

JP        2008-65961 A      3/2008
JP        2008-97723        4/2008
(Continued)

OTHER PUBLICATIONS

Hirotaka Miyamoto et al., Direct Servo Error Signal Detection Method from Recorded Micro-Reflectors, Japanese Journal of Applied Physics 48 (2009) 03A054.
(Continued)

*Primary Examiner* — Thang Tran
*Assistant Examiner* — Dionne Pendleton
(74) *Attorney, Agent, or Firm* — Antonelli, Terry, Stout & Kraus, LLP.

(57) ABSTRACT

An optical disc device and information recording/reading method for an optical disc in which a recording layer is formed through volume recording by aligning recording tracks, which hold information, in a homogenous recording region that does not internally have a layer defining a recording position. The information recording method includes a step in which a first recording layer forming a complex recording layer is formed by forming a recording track while recording information by focusing a main beam at a predetermined depth position in the recording region, and a step in which a second recording layer forming the complex recording layer is formed by forming a recording track while recording information by focusing the main beam at a depth position that is separated from the first recording layer in a depth direction by a depth offset greater than ⅙ of a wavelength of the main beam.

7 Claims, 11 Drawing Sheets

(51) Int. Cl.
*G11B 7/24044* (2013.01)
*G11B 7/2405* (2013.01)

(56) References Cited

U.S. PATENT DOCUMENTS

| | | | |
|---|---|---|---|
| 8,339,908 B2* | 12/2012 | Inoue et al. | 369/44.26 |
| 2008/0008057 A1* | 1/2008 | Takeda et al. | 369/44.23 |
| 2008/0067321 A1 | 3/2008 | Miyamoto et al. | |
| 2009/0245048 A1 | 10/2009 | Ueda et al. | |
| 2009/0316539 A1 | 12/2009 | Mikami et al. | |
| 2010/0039917 A1 | 2/2010 | Ide | |
| 2010/0110846 A1* | 5/2010 | Park et al. | 369/44.23 |
| 2011/0188358 A1 | 8/2011 | Takahashi et al. | |
| 2012/0069722 A1* | 3/2012 | Miura et al. | 369/44.11 |
| 2012/0092977 A1* | 4/2012 | Sakamoto et al. | 369/44.22 |

FOREIGN PATENT DOCUMENTS

| | | |
|---|---|---|
| JP | 2009-238285 | 10/2009 |
| JP | 2009-252337 | 10/2009 |
| WO | WO 2010/038311 A1 | 4/2010 |

OTHER PUBLICATIONS

Japanese Office Action dated Oct. 8, 2013 for Application No. 2010-262820 and partial translation.

* cited by examiner defocus

US 8,958,277 B2

INFORMATION RECORDING METHOD, INFORMATION READING METHOD, AND OPTICAL DISC DEVICE

CROSS REFERENCE TO RELATED APPLICATION

U.S. patent application Ser. No. 13/038,692 is a co-pending application of this application, the content of which is incorporated herein by cross-reference.

CLAIM OF PRIORITY

The present application claims priority from Japanese patent application JP 2010-262820 filed on Nov. 25, 2010, the content of which is hereby incorporated by reference into this application.

BACKGROUND OF THE INVENTION

1. Technical Field

The present invention relates to an information recording method and information reading method using an optical disc, as well as to an optical disc device embodying same.

2. Background Art

Some of the terms used in the description below are based on those used for Blu-ray Discs (BDs). However, the scope of application of the present invention is by no means limited to BDs.

Increasing the storage capacity of optical discs has hitherto been accomplished by, in addition to shortening the wavelength of the light source and increasing the numerical aperture (NA) of the objective lens, increasing the number of recording layers per disc. With BDs, a storage capacity of 50 GB has been attained with two layers by using a blue laser diode and a high-NA objective lens with an NA of 0.85. Further, in 2010, BD XL, which has a storage capacity of 100 GB and above, was put to practical use by increasing the number of recording layers to 3 or 4, while at the same time increasing the surface recording density as well.

As the shortening of the recording wavelength and the increasing of the NA of the objective lens have more or less plateaued, improving surface storage capacity to any significant degree in the future will not be easy. As such, further increasing the number of recording layers would be a promising solution for accomplishing a greater storage capacity than those above. However, if one were to attempt to increase the number of recording layers while maintaining a structure similar to those of conventional multi-layered optical discs, there is a strong possibility that it would be difficult to attain cost reduction in relation to storage capacity. This is because production cost and yield for current multi-layered optical discs are mainly related to the process of forming recording layers. In other words, an increase in the number of layers results directly in an increase in the number of steps, and the ultimate yield is generally determined by the yield of stamping per layer raised to the power of the number of layers.

As such, an optical disc that does not, unlike conventional multi-layered discs, have physically defined recording layers and a recording technique therefor are being studied. As one such example, in the technique disclosed in JP 2008-97723 A (Patent Document 1), micro-holograms, that is, very fine interference fringes, are recorded in a recording region comprising a photorefractive material. Since there are no structures that physically define a recording position in the above-mentioned recording region, the recording position for each micro-hologram is determined by indirectly controlling the focal position of the light used for recording (i.e., recording light). In addition, to provide another example, there are techniques in which recording is performed by forming voids in the recording region as described in JP 2009-238285 A (Patent Document 2). With these recording methods, it is possible to increase virtual recording layers with relative ease, and it is easier to increase the storage capacity per disc. For purposes of convenience, such formats where there are no layers for physically defining recording positions in the recording region will herein be referred to collectively as volume recording.

When the number of recording layers is increased, which also concerns the above-mentioned volume recording, what becomes a problem is the decrease in the amount of light reflected from the layer being read. Since the output of the light source for recording is finite, in order to be able to perform recording with respect to the layer of a disc with numerous recording layers that is farthest as viewed from the surface on which read out light is incident, each of the intervening recording layers would have to be sufficiently transmissive. In other words, the optical reflectivity and absorptivity of each layer would have to be sufficiently low. Further, since the recording sensitivity of recording films is set high in order to perform recording with respect to recording layers with low absorptivity, there is a limit to how far the power of the light emitted from the pickup during reading (i.e., read out light) may be increased. Thus, the amount of light reflected from recording layers during reading generally decreases as the number of recording layers increases. Accordingly, reduced signal to noise ratios (SNR) of read signals become a problem.

As techniques for addressing SNR reductions for read signals, there are such signal amplification techniques that apply optical interference as that disclosed in JP 2009-252337 A (Patent Document 3), namely, techniques in which read signals are amplified by causing reference light, which is obtained from a light source shared with read out light, to interfere, at a photodetector, with reflection light from a recording layer. It is noted that such formats in which reference light, which is obtained from a light source shared with read out light, is made to interfere with read out light at a photodetector and read optical systems thereof will herein be referred to collectively as homodyne detection and homodyne detectors, respectively.

SUMMARY OF THE INVENTION

A problem to be solved by the present invention is to increase volume recording density or disc storage capacity by increasing the use efficiency of recording regions when performing volume recording.

There are certain constraints with respect to increasing the number of virtual recording layers through volume recording. In order to increase virtual recording layers, the thickness of the recording region used would have to be increased. However, dramatically increasing the range over which the spherical aberration of the objective lens can be compensated for that is required in order to do so is not easy. Thus, in seeking to increase storage capacity through volume recording, it is necessary to efficiently utilize recording regions.

In addition, one of the major factors that restrict the use efficiency of recording regions is track-crosstalk. This occurs as light also hits adjacent tracks due to the fact that the optical spot used for reading has a finite size, and the reflected light thereof enters a photodiode of the read system.

In order to solve the problems mentioned above, homodyne detection is employed during reading in the present invention. In addition, volume recording is performed by arranging tracks at positions that provide for a reduction in track-crosstalk from adjacent tracks when homodyne detection is employed.

An information recording method according to the present invention is an information recording method for an optical disc in which a recording layer is formed through volume recording by aligning recording tracks, which hold information, in a homogenous recording region that does not internally have a layer for defining recording positions, the information recording method comprising: a step in which a first recording layer forming a complex recording layer is formed by forming a recording track while recording information by focusing a main beam at a predetermined depth position in the recording region; and a step in which a second recording layer forming the complex recording layer is formed by forming a recording track while recording information by focusing the main beam at a depth position that is separated from the first recording layer in a depth direction by a depth offset greater than 1/6 of the wavelength of the main beam.

It is preferable that the depth offset be equal to or greater than the depth of focus of the objective lens that focuses the main beam. In addition, it is preferable that the depth offset be less than 1/4 of the spacing between two complex recording layers that are adjacent in the depth direction.

With the present invention, an optical disc on which information has been recorded through the above-mentioned information recording method is read employing homodyne detection.

In other words, an information reading method according to the present invention is an information reading method for an optical disc in which a complex recording layer comprising a first recording layer and a second recording layer is volume recorded by aligning recording tracks, which hold information, at two depth positions separated in a depth direction by a depth offset greater than 1/6 of the wavelength of a main beam used for reading, the information reading method comprising: a step in which a main beam emitted from a light source is divided into a first beam and a second beam, and the first beam is focused at a desired recording layer; and a step in which information recorded on the desired recording layer is read by causing the first beam reflected from the desired recording layer and the second beam reflected by a reflecting mirror to optically interfere with each other at a photodetector and obtaining a read signal.

With the present invention, it becomes possible to improve the use efficiency of recording regions, and to increase volume recording density or disc storage capacity.

Problems, structures and effects other than those mentioned above will become apparent through the description of embodiments provided below.

DETAILED DESCRIPTION OF THE PREFERRED EMBODIMENTS

Homodyne detection will first be described. However, since homodyne detection as well as the structure and operations of an optical disc device employing same should be readily comprehensible to a person skilled in the art by referring to Patent Document 3, only an overview as needed to describe the present invention is provided below.

Figure 2:
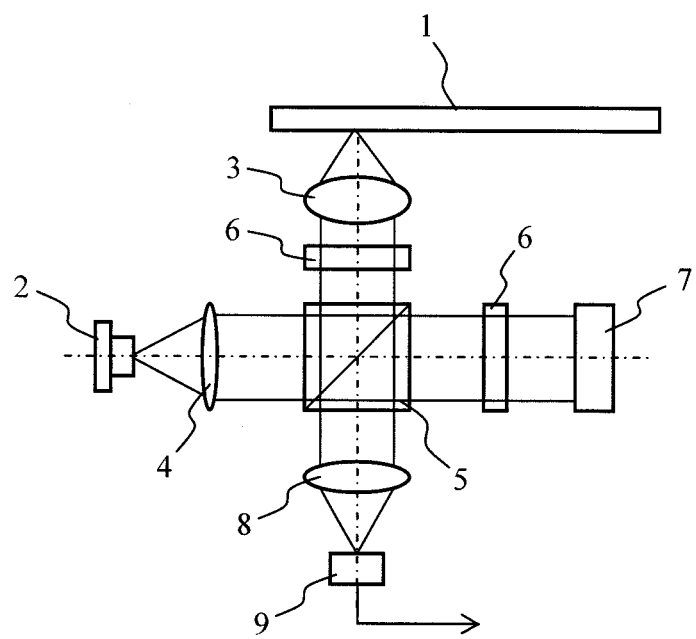
FIG. 2 is a view illustrating the principles of homodyne detection.

FIG. 2 is a view illustrating the principles of a homodyne detector. Laser light emitted from a laser diode 2 is converted to a collimated light beam by a collimator lens 4, and reaches a polarizing beam splitter 5. The polarizing beam splitter has a function whereby it transmits P-polarized light that is incident on its separation plane while reflecting S-polarized light. Thus, of the incident laser light, the P-polarized light component is transmitted as is. The P-polarized component light that is transmitted will hereinafter be referred to as reference light. The reference light that has traveled through the polarizing beam splitter 5 is reflected by a reflecting mirror 7 after traveling through a quarter-wavelength plate 6. The reflected reference light travels through the quarter-wavelength plate 6 again, and reaches the polarizing beam splitter 5. Since it has traveled through the quarter-wavelength plate on both its way to and from to become S-polarized light, the reference light is reflected by the polarizing beam splitter 5, and forms a focal point on a photodiode 9 by a condenser lens 8.

On the other hand, the S-polarized light component of the laser light that is incident on the polarizing beam splitter 5 is reflected and guided towards an objective lens 3 via a quarter-wavelength plate 6. Then, this laser light forms a focal point on a recording layer of an optical disc 1 by way of the objective lens 3, and a portion thereof is reflected. This laser light reflected at the recording layer will hereinafter be referred to as read out light. The read out light follows the same path back to the polarizing beam splitter 5 as it did on its way to the disc. Since the read out light travels through the quarter-wavelength plate on both its way to and from to become P-polarized light, it travels through the polarizing beam splitter 5, and forms a focal point on the photodiode 9 by way of the condenser lens 8.

Here, if the difference between the respective optical distances from the laser diode 2 to the photodiode 9 for the reference light and the reflected light from the recording layer is sufficiently small, the reference light and the read out light will cause optical interference at the photodiode 9. At this point, if the phase difference between the two is small, they will enhance each other's light intensity, and a greater signal amplitude will be obtained as compared to when the reflected light from the recording layer alone is received by the photodiode.

It is noted that since the output laser light of the laser diode that is incident on the polarizing beam splitter 5 is linearly polarized light, it is possible to regulate the intensity ratio of read out light to reference light by appropriately defining the angle of its polarization plane.

Figure 3A:
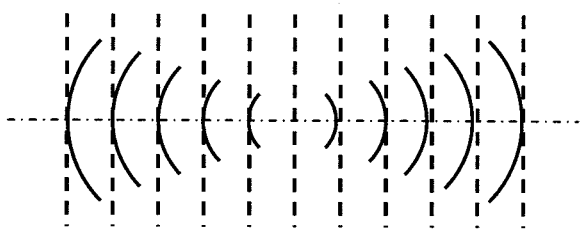
FIGS. 3A and 3B are schematic views illustrating the influence of, of the various interference conditions between read out light and reference light, wavefront shape.
Figure 3B:
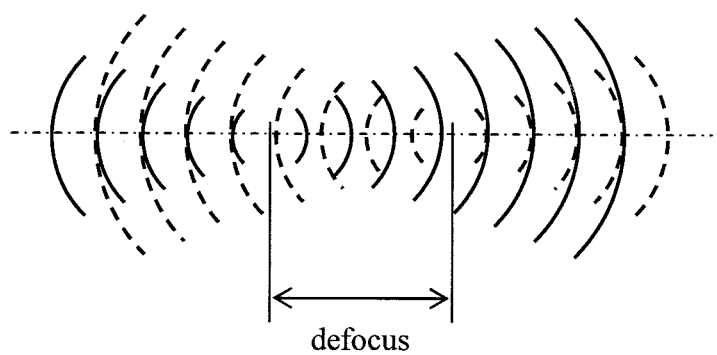

In this case, in order to sufficiently amplify read signal intensity by having the reflected light from the recording layer optically interfere with the reference light at the photodiode, it is necessary that the two strongly interfere with each other. The most basic condition therefor is that, as mentioned above, the phase difference between the two be small. However, in order for the two to completely interfere with each other, a phase match is in fact not enough, and the wavefront shapes of the two must also match. Schematic views illustrating the above are shown in FIGS. 3A and 3B. To make the influence of wavefront shape more readily apparent, FIG. 3A shows, as an extreme example, interference between a spherical wave and a plane wave. It is assumed that the directions in which the spherical wave and the plane wave travel are aligned. In addition, although the wavefront of a spherical wave is three-dimensional, since this cannot be readily depicted on paper, the sectional shapes of the two along a plane in which the optical axis of the spherical wave lies are shown in FIGS. 3A and 3B.

In FIG. 3A, the wavefront shapes of the plane wave and the spherical wave are shown in broken lines and solid lines, respectively. In addition, it is assumed that the two are matched in phase along the optical axis of the spherical wave. As can be seen in FIG. 3A, whereas the paraxial component of the spherical wave is matched in phase with the plane wave, the components that are off the optical axis do not match. In other words, most of the components of the spherical wave do not interfere with the plane wave. Further, unless the wavefront shapes of the two light waves spatially match each other, strong interference does not occur. By way of example, even if both are spherical waves, it is evident that strong interference does not occur if the focal positions of the two do not match as in FIG. 3B. In other words, in employing homodyne detection for reading, if the wavefront shape of the track-crosstalk component light and the wavefront shape of the reference light can be mismatched, the signal component may be amplified while not amplifying the crosstalk component. Consequently, the ratio of read signal component to crosstalk component may be improved. In other words, this is equivalent to suppressing the crosstalk component.

Read systems employing homodyne detection are so designed as to make the wavefront shape of the reference light match the wavefront shape of the read out light component from the read track at the photodiode as much as possible. Therefore, in attempting to suppress the track-crosstalk component in the photodiode output according to the principles above, it follows that one need only differentiate the wavefront shape of the track-crosstalk component light from the wavefront shape of the reflected light from the read track.

One conceivable means for differentiating the wavefront shape of the reflected light from the read track from the wavefront shape of the crosstalk component from an adjacent track would be to vary the respective distances of adjacent tracks in the disc thickness direction (i.e., recording depth) to a sufficient extent. The track-crosstalk component may thus be placed in a defocus state, thereby creating a state corresponding to that shown in FIG. 3B. With respect to volume recording, it is possible to thus sufficiently vary the respective distances of adjacent tracks in the disc thickness direction (i.e., recording depth).

Figure 4A:
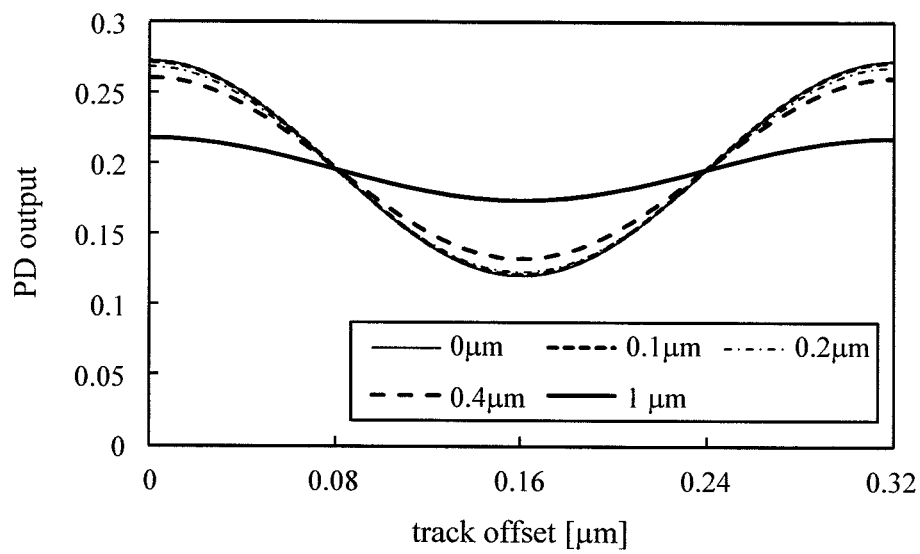
FIGS. 4A and 4B are graphs showing simulation results.
Figure 4B:
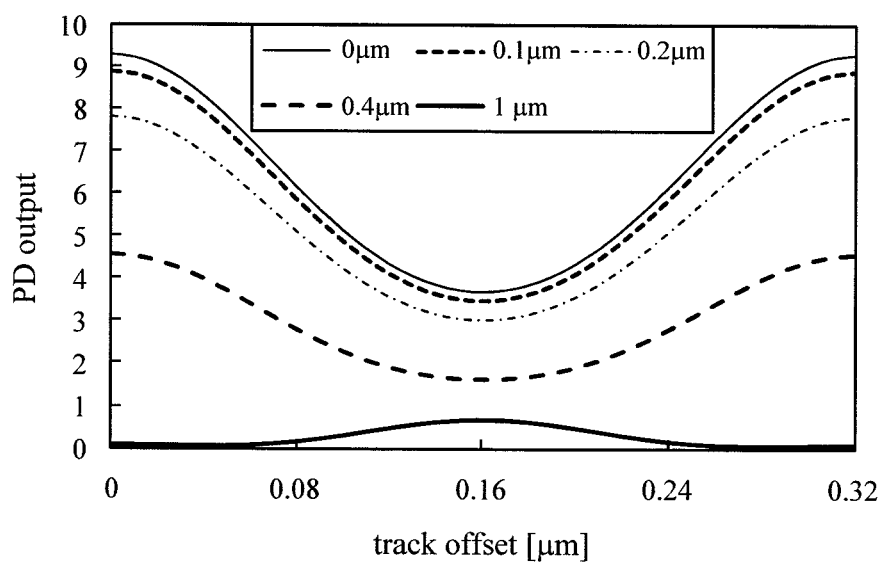

Calculation results for the defocus and track offset dependence of photodiode output based on reflected light from a recorded mark with respect to volume recording are shown in FIGS. 4A and 4B. FIG. 4A represents a case where a conventional optical disc read system is used, and FIG. 4B a case where a homodyne detector is used. Calculations assumed volume recording, and while assuming a finite value for the reflectivity of the recorded marks, a reflectivity of 0 was assumed for everything else. In other words, it was assumed that a track comprising recorded marks having a finite reflectivity and a finite area exists in a transparent material. In addition, the light's wavelength was 405 nm, which is the same as BD, and the NA of the lens 0.85, likewise. The track pitch was 320 nm, and it was assumed that the same marks exist in the adjacent track. Further, the mark width was ⅓ of the track pitch, and both the mark length and the space length were 596 nm.

The horizontal axes in FIGS. 4A and 4B represent track offset, and the vertical axes the amount of reflected light. In addition, the change in the amount of reflected light in the track offset direction is plotted for each defocus amount.

Looking at changes directly above the mark (i.e., a track offset of 0 nm) in FIG. 4A, it appears that in the conventional optical disc format, the amount of reflected light from the mark decreases gradually as the defocus amount increases, while the amount of light from the space increases. In addition, if the defocus is extreme, the marks and spaces become averaged. This is a phenomenon that should be readily comprehensible to a person skilled in the art.

On the other hand, looking at changes directly above the mark (i.e., a track offset of 0 nm) in the case of homodyne detection in FIG. 4B, as the defocus amount increases, the amount of reflected light from the mark decreases as in FIG. 4A. However, the rate of decrease thereof is more rapid as compared to the case of the conventional format. As discussed above, this is because the difference in wavefront shape between the read out light and the reference light becomes greater as defocus increases, thereby causing the amplification rate to drop.

Next, turning view point to changes directly above the midpoint between tracks (i.e., a track offset of 160 nm), in the example of the conventional read system of FIG. 4A, the amount of reflected light from the space appears to increase. On the other hand, in the case of homodyne detection of FIG. 4B, contrary to the conventional format, the amount of reflected light decreases as the defocus amount increases. The reason for this decrease is the same as that for the case of directly above the mark, which is that the difference in wavefront shape with respect to the reference light becomes greater.

In other words, when homodyne detection is employed, crosstalk from adjacent tracks may be reduced by varying the respective distances of adjacent tracks in the disc thickness direction (i.e., recording depth) to a sufficient extent. By utilizing this characteristic, it becomes possible to narrow the track pitch.

The phenomenon above was observed under specific calculation conditions. However, when its cause is considered, the discussion above has generality, and will generally hold even if such parameters as track pitch, mark width, etc., which are calculation conditions, were to be varied within reasonable ranges.

Figure 1B:
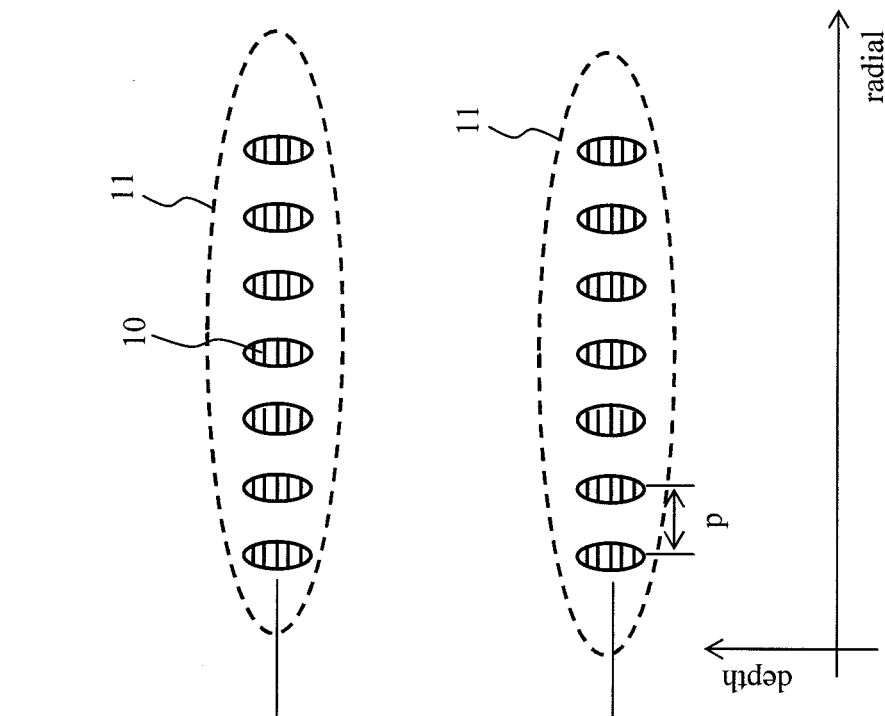
FIGS. 1A and 1B are illustrative views of an example in which the present invention is implemented.
Figure 1A:
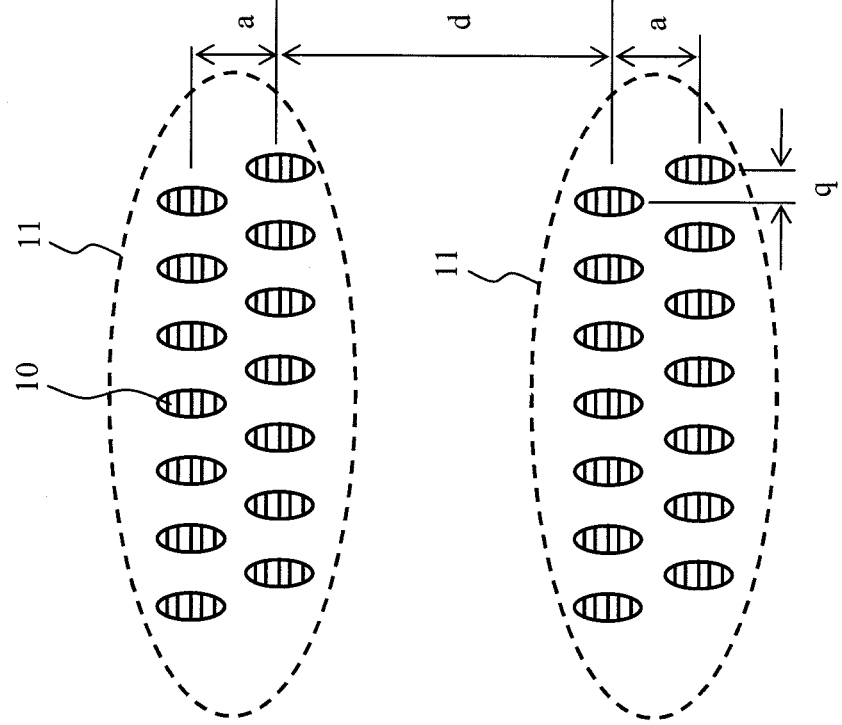

A view illustrating an example in which the present invention is implemented is shown in FIG. 1A. In addition, for purposes of comparison, shown in FIG. 1B is an example where a conventional read out optical system is used. FIGS. 1A and 1B are illustrative views representing the arrangement, as observed from a cross-section of the disc sectioned in the radial direction, of tracks 10 recorded, through volume recording, in a recording region of an optical disc that does not have a physically defined recording layer. In other words, the horizontal axis represents the radial direction of the disc, and the vertical axis the depth direction relative to the disc surface. In volume recording as disclosed in Patent Document 1, etc., recording is performed in a state where a guide beam is focused on a reference layer provided within the disc. Further, as the reference layer is provided with a spiral groove, when viewed in a cross-section taken along the radial direction of the disc, the tracks comprising a series of recorded marks would appear as if they form virtual recording layers (hereinafter simply referred to as recoding layers 11) as shown in FIG. 1B.

In contrast to conventional techniques, in the present invention, the tracks in the recording layer 11 are not located within a single plane, and adjacent tracks vary in recording depth as shown in FIG. 1A. In this example, recording depths of adjacent tracks are alternately varied by a certain depth offset, a. In this case, distance q in the radial direction between adjacent tracks varying in recording depth will be referred to as effective track pitch. As discussed in connection with FIG. 3A, depth offset a1. is set to a depth that is required to sufficiently suppress crosstalk from adjacent tracks by performing reading employing homodyne detection.

Figure 5:
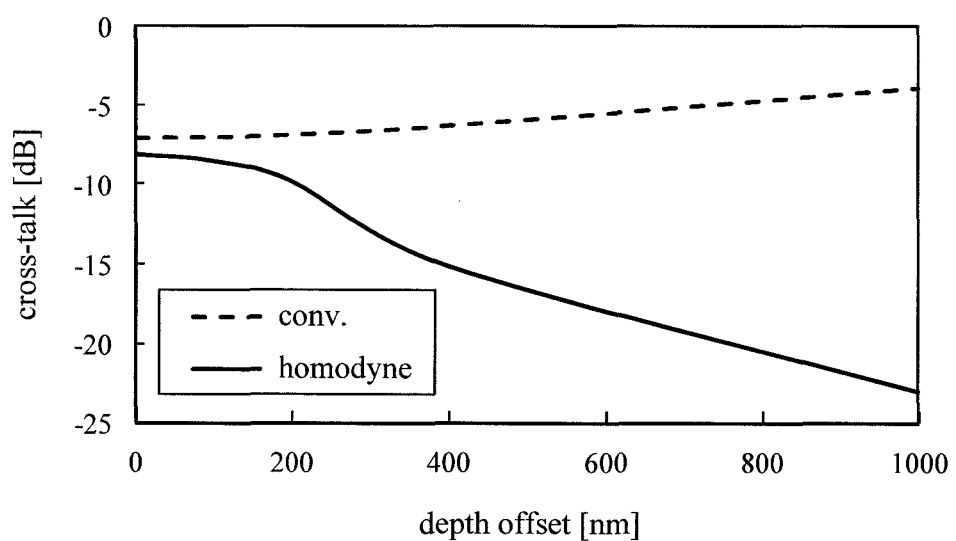
FIG. 5 is a graph of calculation results for changes in the amount of light reflected from an adjacent track.

FIG. 5 represents calculation examples showing the effect of depth offset. With respect to a case where tracks are arranged in the manner shown in FIG. 1A, FIG. 5 plots changes in photodiode output based on light reflected from an adjacent track (crosstalk component light) as observed at the center of a given track and normalized with respect to the output at the center of the given track. The horizontal axis represents defocus amount, and for purposes of comparison, there are shown a case where a conventional read out optical system is used and a case where a homodyne detector is used. The solid line represents the case where a homodyne detector is used. The read out optical system and the calculation conditions, e.g., track pitch, etc., are the same as those in FIGS. 4A and 4B.

It can be seen from FIG. 5 that with the conventional read out optical system, depth offset has no track-crosstalk suppressing effect, and that track-crosstalk influences actually become greater as depth offset increases. On the other hand, it can be seen that when homodyne detection is employed, the influence of reflected light from an adjacent track decreases monotonically as depth offset increases. The graph shown in FIG. 5 may be thought to correspond to the top level of the track-crosstalk component within the read signal. As such, at a depth offset of 0, the ratio of track-crosstalk within the read signal would amount to as much as approximately −8 dB. At such a level, it would be difficult to attain a viable error rate even with optical disc signal processing techniques that are in practical use today. In contrast, when the depth offset is set to 600 nm, which is roughly comparable to the depth of focus of the read out optical system being used, namely 560 nm, it drops dramatically to as far down as −17 dB. While this still may not be considered a favorable condition when compared to current optical discs, it is within a range that sufficiently provides for practical use by means of advanced error correction codes.

Next, the number of tracks per unit sectional area within a recording region (recording space) (hereinafter simply referred to as track density) is discussed with reference to FIGS. 1A and 1B. First, a conventional case is considered. For purposes of brevity, it is assumed that the spacing between recording layers is a constant value, d. In addition, assuming the track pitch is p, then track density m is given by m=1/(pd). On the other hand, with respect to a case based on the present invention, since the effective interlayer spacing is increased to d+2a, the number of tracks n per unit sectional area in the recording region is given by n=1/(q(d+2a)). Thus, as an example comparable to BD XL, assuming q=p/2=160 nm and a=1000 nm with respect to d=10000 nm and p=320 nm, then n/m=1.67, thus realizing a track density that is approximately 1.67 times greater than what is conventional. In addition, when conditions satisfying n>m are calculated with respect to q=p/2, the result is a<d/4. It is noted that if the interlayer spacing is not constant, the discussion above may be applied using the average interlayer spacing.

Tracks in the same recording layer have conventionally been formed within the same plane. In optical discs of a land-groove recording format, such as DVD-RAM, recording is performed both with the land and the groove, and thus, strictly speaking, they do not lie in the same plane geometrically. However, in the case of DVD-RAM, since the depth of the groove is shallower than the depth of focus of the read out light at approximately ⅙ of the wavelength of the read out light, both the land and the groove lie within the same plane optically. In other words, the wavefront shapes of the reflected light from both the land and the groove may be considered the same.

Figure 6:
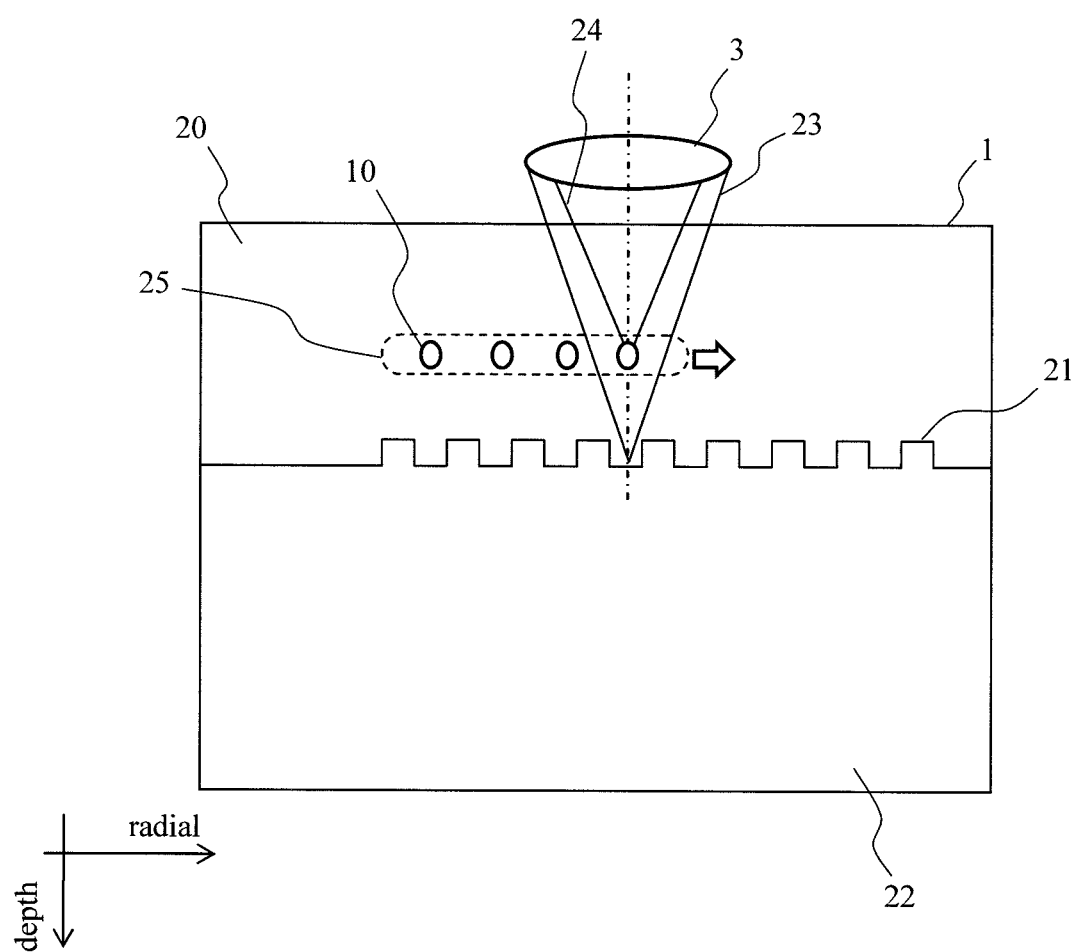
FIG. 6 is a schematic view illustrating how recording is performed on the A-layer.

Next, recording operations are described using FIG. 6. The optical disc 1 is such that a recording region 20 comprising a recording material is formed on a substrate 22. The recording material may be a nitrocellulose-based resin. At the time of molding of the substrate 22, grooves are simultaneously formed in the surface thereof, and a reflection layer is deposited thereabove, thereby forming a reference layer 21. The recording region 20 is formed above the reference layer 21. The recording region 20 is initially homogenous, and does not internally have a layer that physically defines a recording position. FIG. 6 corresponds to what may be observed in a cross-section taken along the radial direction in the middle of recording. A guide beam 23 forms a focal point on the reference layer 21 via the objective lens 3. The guide beam 23 is red laser light. The guide beam 23 obtains a focusing signal and a tracking signal using the reference layer 21. A main beam 24 forms a focal point at a recording depth pre-specified by the objective lens 3. In order to form the focal point of the recording light at the specified recording depth, spherical aberration needs to be compensated for in accordance with the distance from the disc surface. However, since methods therefor should be readily apparent to those skilled in the art, a description thereof will be omitted herein.

In the description below, among the recording layers on which recoding is performed based on the present invention, the collection of tracks closer to the reference layer 21 will be referred to as A-layer 25 for purposes of convenience, while the collection of tracks further from the reference layer 21 will be referred to as B-layer 26. The groove formed in the reference layer 21 is single spiral. When recording on the A-layer, the guide beam is tracked with respect to the groove in the reference layer, and a track comprising a series of voids is formed directly above the groove from the inner circumference towards the outer circumference.

Figure 7:
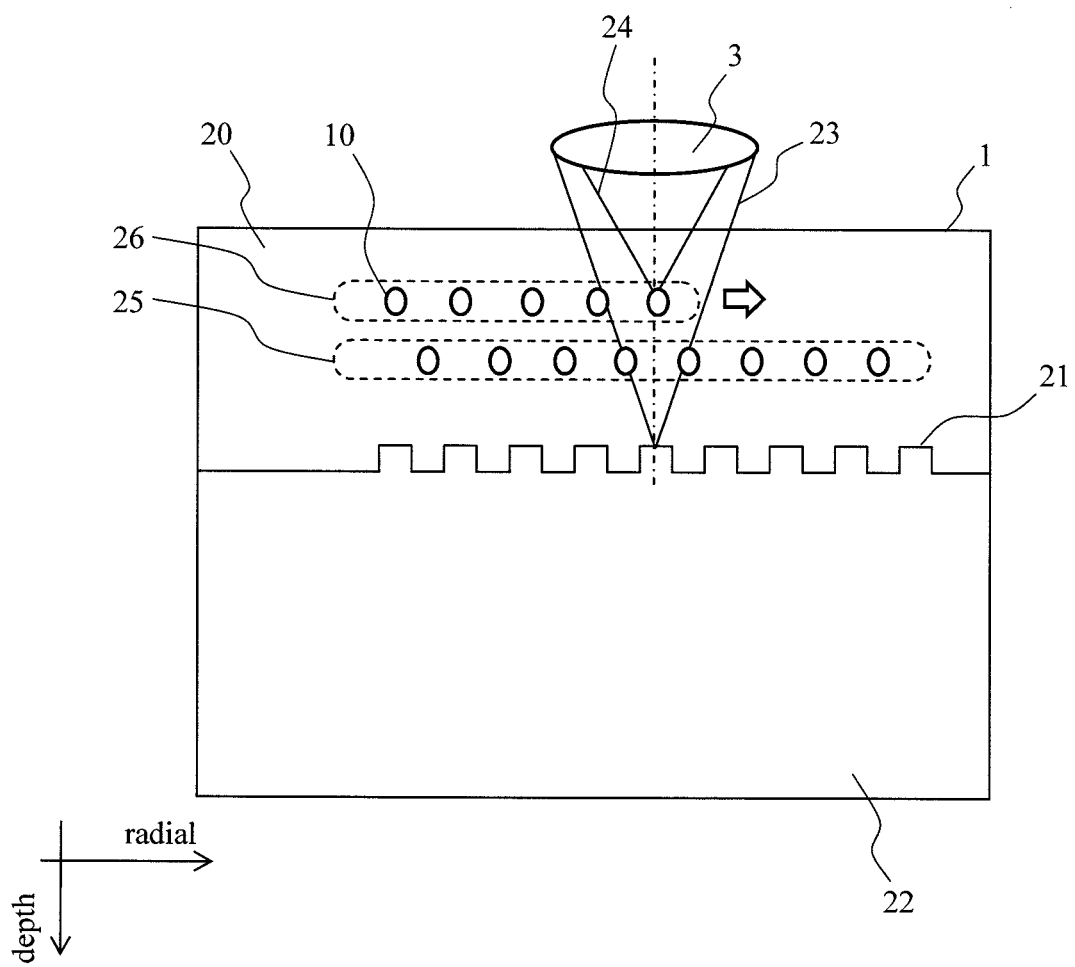
FIG. 7 is a schematic view illustrating how recording is performed on the B-layer.

Once recording is completed for the A-layer up to the outermost circumference, recording is performed on the B-layer. A schematic view for this is shown in FIG. 7. When recording on the B-layer, the guide beam 23 is tracked with respect to the land from the inner circumference again, and a track is formed directly above the land. It is noted that while the example above assumes a recording direction that is from the inner circumference to the outer circumference, depending on the directions of the spiral and disc rotation, the recording direction may naturally be from the outer circumference to the inner circumference. In addition, although the reference layer is provided at the boundary between the substrate and the recording region in the example above, it may, of course, be provided near the surface of the disc on which light is incident.

It is also noted that although, in reality, a plurality of complex recording layers are formed, only two complex recording layers are shown in FIGS. 1A and 1B for purposes of brevity. In order to perform recording on a given complex recording layer following some other complex recording layer, the recording depth of the recording light focal point from the reference layer is displaced by d, and a process similar to that above is repeated.

When reading an already recorded track, focus and tracking control using the reference layer is, of course, possible. As presented in the Japanese Journal of Applied Physics, 48 (2009) 03A054 (Non-Patent Document 1), it is also possible to directly detect a focus error signal and a track error signal from an already recorded recording layer and track without using a reference layer.

When performing postscript recording on a layer that is partially recorded, in reference control formats, the depth of focus of the recording light may sometimes differ from that of the already recorded track depending on individual differences or design variations among drives. This may cause compromised compatibility. One method of addressing this would be to detect a focus error signal and a track error signal from a track within an already recorded recording layer, and calibrate focus error signals and track error signals detected from an already recorded track and the reference layer. With this method, the procedure would differ depending on whether postscript recording is to be performed on the A-layer or the B-layer.

Figure 8:
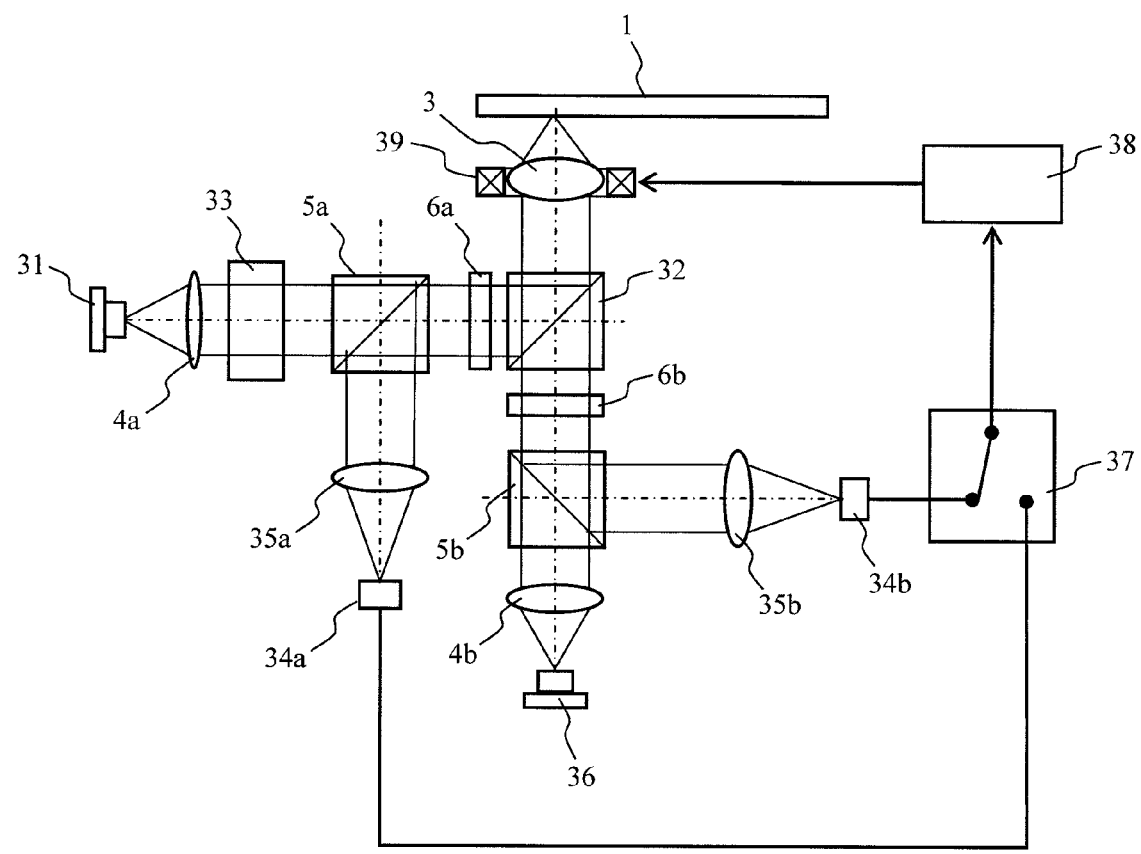
FIG. 8 is a view showing a configuration example of an optical disc device.

FIG. 8 is a configurational diagram of an optical disc device based on the present invention. However, as the diagram is provided to explain the procedure for calibrating the focal position of the main beam during reading or prior to postscript recording, elements irrelevant thereto have generally been omitted. Since homodyne detection, and the requisite interference between the read out light and the reference light therefor are also irrelevant to the discussion at hand, they are not shown in the diagram nor described below. One feature of this example is that it is possible to choose whether to use a reference beam or the main beam for the detection of an error signal to be used in feedback control for focusing and tracking.

The light source of the main beam is a blue laser diode 31. Blue laser light emitted therefrom is converted to a collimated light beam by a collimator lens 4a, travels through a polarizing beam splitter 5a after undergoing spherical aberration compensation at a relay lens 33, and is turned into circularly polarized light by a quarter-wavelength plate 6a. Then, after being reflected by a dichroic prism 32, it forms a focal point within the recording region of the optical disc 1 via the objective lens 3. Here, if the focal point of the main beam is at an already recorded recording layer, a portion of the main beam light would be reflected by recorded marks and return to the polarizing beam splitter 5a. Because it travels through the quarter-wavelength plate 6a again on its way back, its polarization direction is altered by 90° from its initial direction. Consequently, it is reflected by the polarizing beam splitter 5a and focused on a quadrant photodiode 34a by an asymmetric condenser lens 35a. Astigmatism is deliberately caused at the asymmetric condenser lens 35a, and a focus error signal is obtained by an astigmatic method in combination with the quadrant photodiode 34a. With respect to the asymmetric condenser lens, comparable functions may also be attained through a combination of a spherical lens and a cylindrical lens. In addition, it is well-known to those skilled in the art that a track error signal may also be obtained concurrently from the quadrant photodiode output.

The light source of the guide beam is a red laser diode 36. Red laser light emitted therefrom is converted to a collimated light beam by a collimator lens 4b, travels through a polarizing beam splitter 5b, and is turned into circularly polarized light by a quarter-wavelength plate 6b. Then, after traveling through the dichroic prism 32, it forms a focal point on the reference layer of the optical disc 1 via the objective lens 3. A portion of the guide beam is reflected at the reference layer and returns to the polarizing beam splitter 5b. Because it travels through the quarter-wavelength plate 6b again on its way back, its polarization direction is altered by 90° from its initial direction. Consequently, it is reflected by the polarizing beam splitter 5b and focused on a quadrant photodiode 34b by an asymmetric condenser lens 35b. Astigmatism is deliberately caused at the asymmetric condenser lens 35b, and a focus error signal is obtained by an astigmatic method in combination with the quadrant photodiode 34b.

From the error signals detected in the blue system and the red system, one is selected via a selector 37 as required and sent to a control device 38. The control device 38 drives an actuator 39 using the inputted error signal to perform focus and tracking feedback control of the lens.

Figure 9:
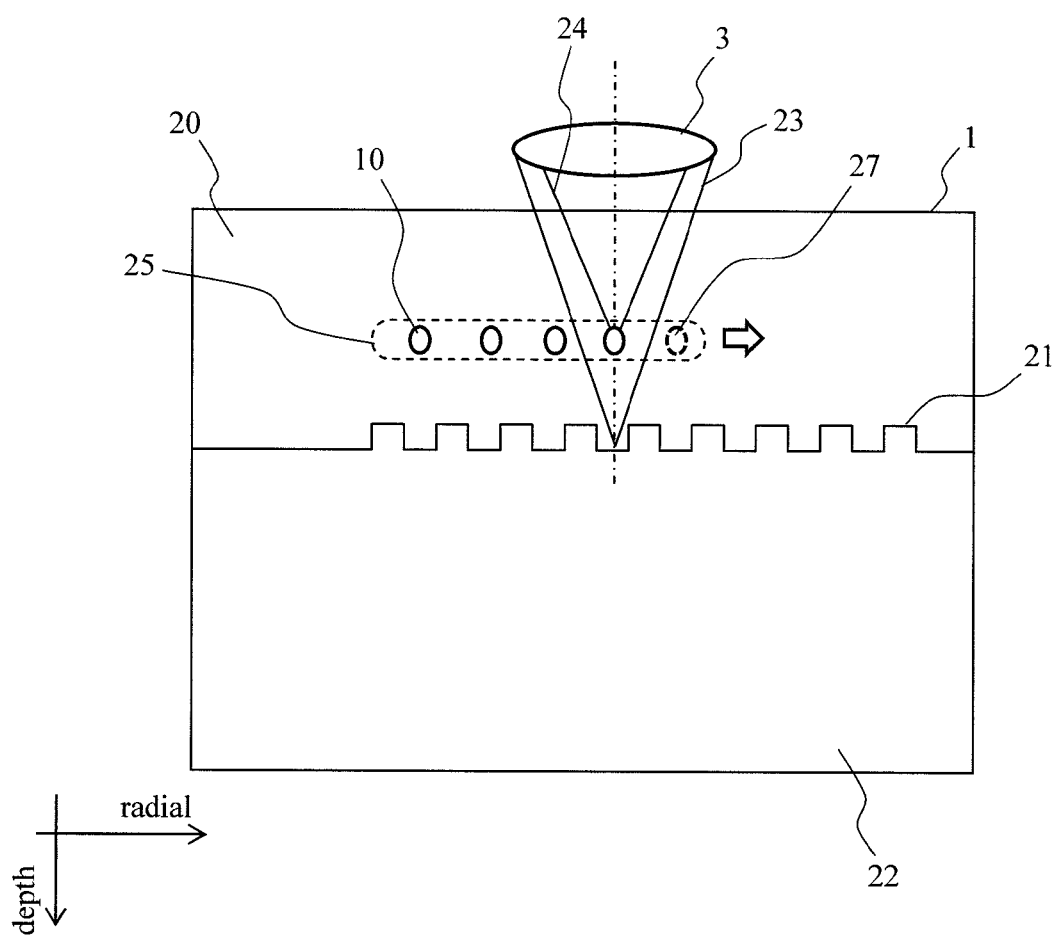
FIG. 9 is a view illustrating main beam focal position adjustment with respect to the A-layer.

Next, with respect to the example shown in FIG. 8, a case where postscript recording is performed on a partially recorded A-layer will be described using FIGS. 8 and 9. As previously discussed, prior to initiating postscript recording, it is necessary to align the depth of focus of the main beam to be used as recording light with the depth of the already recorded track within the A-layer. First, after selecting, via the selector 37, the focus error signal detected through the red system, the objective lens 3 is driven by the actuator 39 in such a manner that the focus error signal would be the local minimum, and a seek is performed with respect to the already recorded region of the A-layer as shown in FIG. 9. At this point, the power of the main beam 24 is, of course, set to the same level as during reading. If, at this point, the error is also 0 for the focus error signal detected with the main beam, the focal position of the main beam 24 is the same as the already recorded track in the A-layer. Therefore, even if postscript recording were to be performed while controlling the focus using the guide beam 23, no problems would arise. However, if there is a non-negligible mismatch between the two, the focal position of the main beam is corrected by adjusting the relay lens 33 in such a manner that the focus error signal detected with the main beam would be the local minimum, typically 0. Once this adjustment is completed, it becomes possible to keep the focal point of the main beam at the same depth as the track of the already recorded A-layer solely through focus control based on the guide beam with respect to the reference layer.

Similarly with respect to tracking error, it is determined whether or not there is a difference between those detected with the guide beam and the main beam. If there is a difference, the tracking error signal detected with the guide beam is corrected by adding an offset signal electrically. While thereafter performing control based on the guide beam, postscript recording is begun upon arrival of the main beam at a postscript recording track position 27. The timing for beginning postscript recording is obtained by reading address and frame information from an already recorded track with the main beam. Alternatively, it is also possible to employ a method in which it is obtained from the surface structure of the reference layer. By thus forming a recording track while recording information at the same depth position as the A-layer, postscript recording is performed with respect to the partially recorded A-layer.

Although the discussion above relates to performing postscript recording with respect to the A-layer, the focal point of the main beam may be aligned with the A-layer through similar operations during the reading of the A-layer as well.

Figure 10:
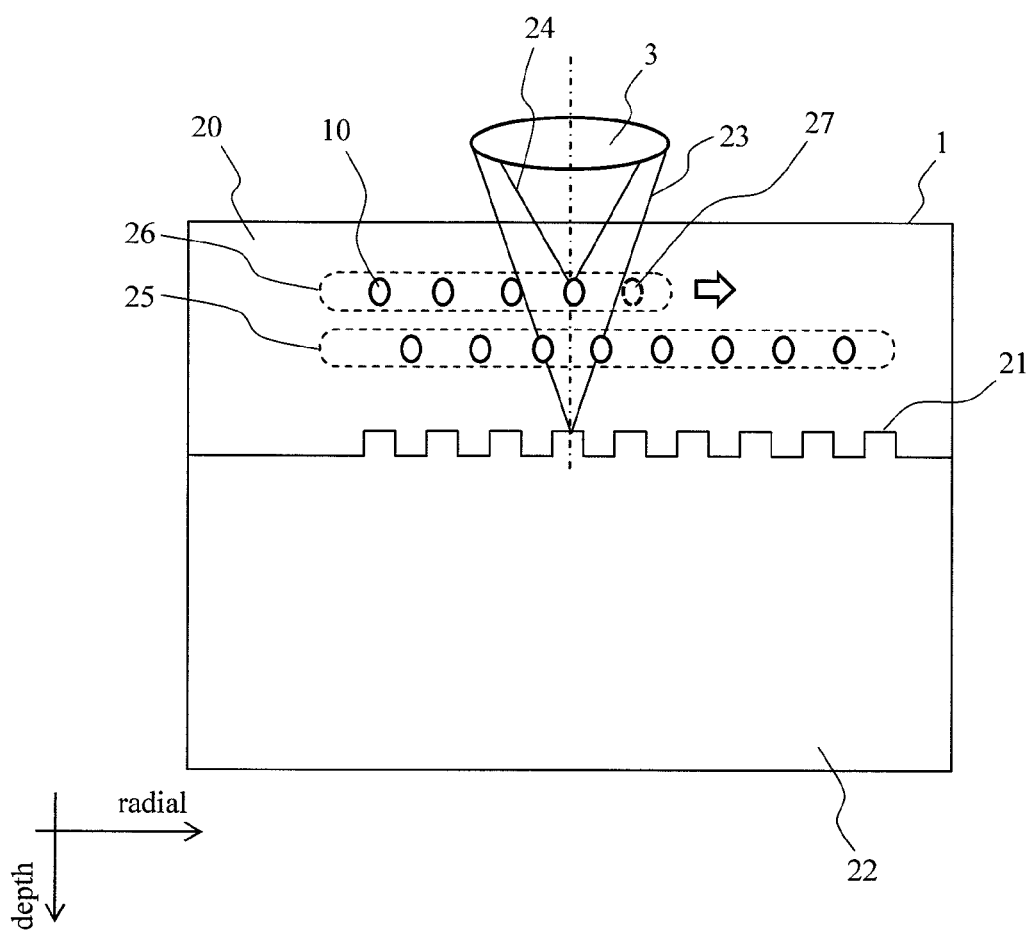
FIG. 10 is a view illustrating main beam focal position adjustment with respect to the B-layer.
Figure 11:
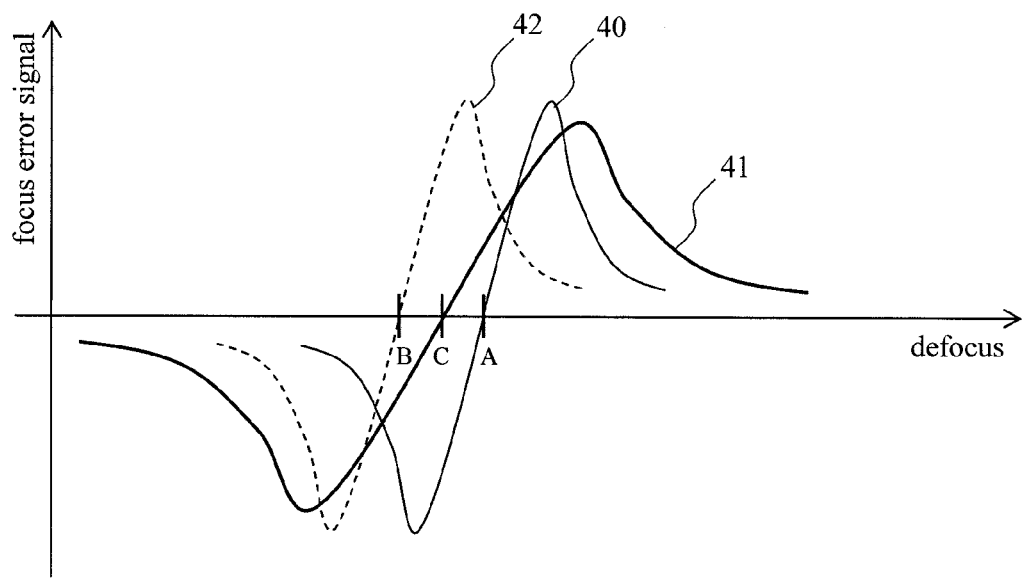
FIG. 11 is a graph showing FES curves used for main beam focal position adjustment with respect to the B-layer.

Next, a case where postscript recording is performed with respect to a partially recorded B-layer is discussed using FIG. 10. As in the case where postscript recording is performed with respect to the A-layer, it is necessary to align the depth of focus of the main beam with the depth of the already recorded track in the B-layer prior to initiating postscript recording. However, when performing postscript recording with respect to the partially recorded B-layer, if the spacing between the A-layer and the B-layer is significantly narrower than interlayer spacing d, the B-layer will sometimes not be separately observed from the A-layer in terms of focus error signal as shown in FIG. 11. In such cases, it would be necessary to employ a method such as the one discussed below in order to align the depth of focus of the main beam with the recording depth of the already recorded B-layer.

FIG. 11 schematically shows focus error signals (FESs) obtained at the recording layer in which a partially recorded B-layer exists. Where only the A-layer is recorded, an A-layer FES curve 40 is observed as an FES curve. Since the B-layer cannot exist on its own, B-layer FES curve 42 is a virtual FES curve that is not directly observable. However, its form is generally the same as that of the A-layer FES curve where its intersection with the horizontal axis is shifted by an amount corresponding to the depth offset. Further, where both the A-layer and the B-layer are recorded, a combined FES curve 41 is observed as an FES curve, the combined FES curve 41 corresponding to what is observed as a result of the A-layer FES curve and the B-layer FES curve being combined.

Thus, if the focal position of the main beam were to be adjusted using the actually observable A-layer FES curve, it would be adjusted at point A in FIG. 11. Also, if the focal position of the main beam were to be likewise adjusted using the actually observable combined FES curve 41, it would be adjusted at point C in FIG. 11. In either case, it would differ from point B at which it is meant to be adjusted.

Point B, which is to be aimed for, lies along a curve that is not directly observable. As discussed above, the form and amplitude of the B-layer FES curve are expected to be substantially the same as those of the A-layer FES curve. Accordingly, assuming that the forms and amplitudes of the two are identical, the position of point B is inferred using the actually observable A-layer FES curve and combined FES curve. In other words, after selecting, via the selector 37, the focus error signal detected through the red system, a region in the recording layer where only the A-layer is already recorded is sought. In so doing, the actuator 39 so drives the objective lens 3 as to focus the guide beam 23 on the reference layer 21. Then, switching the selector 37 to the blue system, the focal position of the main beam is corrected by adjusting the relay lens 33 until the focus error signal detected with the main beam becomes 0. Upon completion of this adjustment, the focal point of the main beam would be at the same depth as the track of the already recorded A-layer. In other words, point A is derived. The position of the relay lens 33 at this point is memorized.

Next, as shown in FIG. 10, via the selector 37, the error signal detected by the quadrant photodiode 34b of the red system is selected, seeking is performed with respect to a region where both the A-layer and the B-layer are already recorded while performing focus control using the reference beam at the relevant recording layer, and the focal position of the main beam is corrected by adjusting the relay lens 33 until the focus error detected with the main beam becomes 0. Point C is derived upon completion of this adjustment. The position of the relay lens 33 at this point is memorized.

Since it is assumed that the form and amplitude of the B-layer FES curve are the same as those of the A-layer FES curve, the distance between point B and point C in FIG. 11 should be equal to the distance between point A and point C. It is thus possible to infer the position of the relay lens that is to be set when recording on the B-layer. In other words, from the position of the relay lens 33 corresponding to point A and the position of the relay lens 33 corresponding to point C, the position of the relay lens that is to be set when recording on the B-layer is derived, and the relay lens 33 is adjusted to the thus derived position. As this adjustment focuses the main beam at the same depth position as the B-layer, by forming a track while recording information upon the arrival of the main beam at the postscript recording track position 27, postscript recording may be performed with respect to the B-layer.

Although the discussion above relates to performing postscript recording with respect to the B-layer, similar operations are sometimes required during reading as well. In other words, when reading a recording layer where both the A-layer and the B-layer are already recorded, if control were to be performed by detecting the focus error with the main beam, the focal point would be aligned midway between the A-layer and the B-layer since the FES curve detected in this case would be the combined FES curve 41. As a method for properly aligning the focal point of the main beam with the intended layer, one may consider adding an electrical offset to the focusing signal while monitoring the quality of the read signal. However, this method is time consuming.

As such, while leaving a portion of the B-layer unrecorded, first, the focus error is detected with the main beam at a region where only the A-layer is recorded, and the focal position of the objective lens 3 is controlled by driving the actuator 39 so that the focus error signal would be the local minimum The time average value for the actuator drive voltage at that point is memorized, which would correspond to point A in FIG. 11. Moving next to a region where both the A-layer and the B-layer are already recorded, the focus error is detected with the main beam, and the focal position of the objective lens 3 is controlled by driving the actuator 39 so that the focus error signal would be the local minimum. Then, the time average value for the actuator drive voltage at that point is memorized, which would correspond to point C in FIG. 11. The position of point B is inferred from the values of these two points, and is added to the actuator control signal as an electrical offset in reading the B-layer. Similarly, when reading the A-layer, an offset corresponding to the distance between point A and point C in FIG. 11 is added to the actuator control signal.

Figure 12:
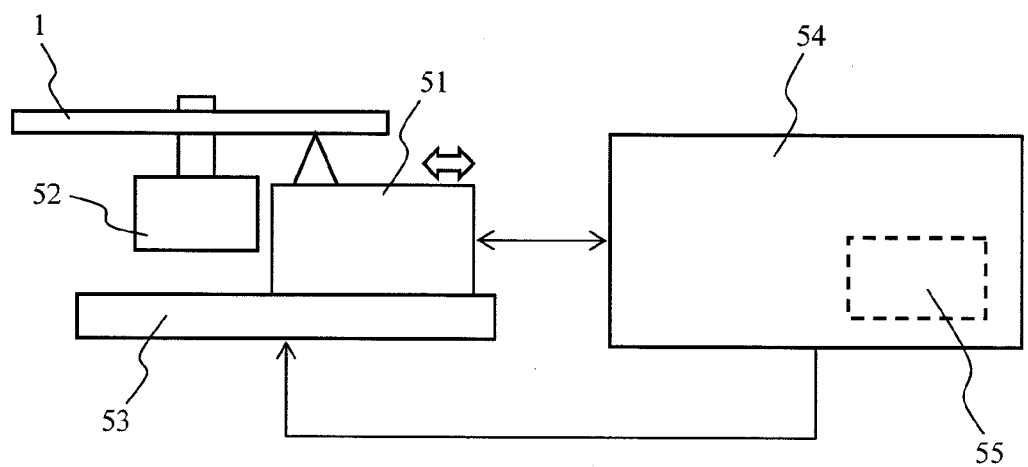
FIG. 12 is a schematic view showing a configuration example of an optical disc device.

FIG. 12 shows an example of the configuration of an optical disc device. The optical disc 1 is rotated by a spindle motor 52. A pickup 51 comprises light sources for recording/reading, an optical system including an objective lens, etc., as shown in FIG. 8, for example. Since it is a device based on the present invention, homodyne detection is employed for the read out optical system. The pickup 51 performs seeking by means of a slider 53. Seeking, rotation of the spindle motor, etc., are performed based on instructions from a main circuit 54. The main circuit comprises a dedicated circuit, e.g., signal processing circuit, feedback controller, etc., a microprocessor, memory, etc. What controls the overall operation of the optical disc device is firmware 55. The firmware 55 is stored on memory in the main circuit. The focal position adjustment of the main beam during postscript recording discussed above is also performed according to firmware instructions.

It is noted that the present invention is by no means limited to the embodiments mentioned above, and instead covers diverse variations. By way of example, the embodiments above are described in detail in order to illustrate the present invention in a readily comprehensible manner, and are not meant to be limiting in the sense that all of the features described must be provided. Further, some of the features of a given embodiment may be replaced with features of another embodiment, and features of a given embodiment may be added to the features of another embodiment. Still further, some of the features of the embodiments above may be removed, replaced with other features, or have other features added.

LIST OF REFERENCE NUMERALS 1 optical disc
2 laser diode,
3 objective lens
4 collimator lens
5 polarizing beam splitter
6 quarter-wavelength plate
7 reflecting mirror
8 condenser lens
9 photodiode
10 track
11 recording layer
20 recording region
21 reference layer
22 substrate
23 guide beam
24 main beam
25 A-layer
26 B-layer
27 postscript recording track position
31 blue laser diode
32 dichroic prism
33 relay lens
34 quadrant photodiode
35 asymmetric condenser lens
36 red laser diode
37 selector
38 control device
39 actuator
40 A-layer FES curve
41 combined FES curve
42 B-layer FES curve
51 pickup
52 spindle motor
53 slider
54 main circuit
55 firmware
a depth offset
d basic interlayer spacing
p basic track pitch
q effective track pitch

What is claimed is:

1. An information recording method for forming a recording layer in an optical disc, through volume recording by aligning recording tracks, which hold information in a homogenous recording region that does not internally have a layer defining a recording position, the information recording method comprising:

forming a first recording layer forming a complex recording layer, by forming a recording track while recording information, by focusing a main beam at a predetermined depth position in the recording region; and forming a second recording layer forming the complex recording layer, by forming a recording track while recording information, by focusing the main beam at a depth position separated from the first recording layer in a depth direction by a depth offset greater than one-sixth (1/6) of a wavelength of the main beam;

wherein a focal position of the main beam is controlled by using a first focus error signal;

wherein the first focus error signal is detected from a guide beam reflected from a reference layer the guide beam being focused on the reference layer, and the guide beam having a wavelength that differs from the wavelength of the main beam; and wherein an effective track pitch of the complex recording layer is one-half (1/2) of a track pitch of the first or second recording layer.

2. An information recording method for forming a recording layer in an optical disc, through volume recording by aligning recording tracks, which hold information, in a homogenous recording region that does not internally have a layer defining a recording position, the information recording method comprising:

forming a first recording layer forming a complex recording layer, by forming a recording track while recording information, by focusing a main beam at a predetermined depth position in the recording region;

forming a second recording layer forming the complex recording layer, by forming a recording track while recording information, by focusing the main beam at a depth position separated from the first recording layer in a depth direction by a depth offset greater than one-sixth (1/6) of a wavelength of the main beam; and forming another complex recording layer with an interlayer spacing greater than the depth offset with respect to the complex recording layer;

wherein a focal position of the main beam is controlled by using a first focus error signal;

wherein the first focus error signal is detected from a guide beam reflected from a reference layer, the guide beam being focused on the reference layer, and the guide beam having a wavelength that differs from the wavelength of the main beam; and wherein the depth offset is less than one-quarter (1/4) of a spacing between two complex recording layers that are adjacent in the depth direction.

3. An information recording method for forming a recording layer in an optical disc, through volume recording by aligning recording tracks, which hold information, in a homogenous recording region that does not internally have a layer defining a recording position, the information recording method comprising:

forming a first recording layer forming a complex recording layer, by forming a recording track while recording information, by focusing a main beam at a predetermined depth position in the recording region; and forming a second recording layer forming the complex recording layer, by forming a recording track while recording information, by focusing the main beam at a depth position separated from the first recording layer in a depth direction by a depth offset greater than one-sixth (1/6) of a wavelength of the main beam;

wherein a focal position of the main beam is controlled by using a first focus error signal;

wherein the first focus error signal is detected from a guide beam reflected from a reference layer, the guide beam being focused on the reference layer, and the guide beam having a wavelength that differs from the wavelength of the main beam; and wherein the optical disc includes a reference layer including a groove, the information recording method further comprising:

focusing the main beam at a region in the complex recording layer where only the first recording layer is formed, and detecting a second focus error signal from the main beam reflected from the complex recording layer;

adjusting the focal position of the main beam to a first adjustment value, so that a value of the second focus error signal is at a local minimum;

focusing the main beam at a region in the complex recording layer where both the first recording layer and the second recording layer are formed, and detecting a third focus error signal from the main beam reflected from the complex recording layer;

adjusting the focal position of the main beam to a second adjustment value, so that a value of the third focus error signal is at a local minimum;

calculating an adjustment value for focusing the main beam at the second recording layer from the first adjustment value and the second adjustment value; and forming a recording track while postscript recording information with the main beam at a depth position of the second recording layer, by setting the focal position of the main beam at the calculated adjustment value.

4. An information recording method for forming a recording layer in an optical disc, through volume recording by aligning recording tracks, which hold information, in a homogenous recording region that does not internally have a layer defining a recording position, the information recording method comprising:

forming a first recording layer forming a complex recording layer, by forming a recording track while recording information, by focusing a main beam at a predetermined depth position in the recording region;

forming a second recording layer forming the complex recording layer, by forming a recording track while recording information, by focusing the main beam at a depth position separated from the first recording layer in a depth direction by a depth offset greater than one-sixth (⅙) of a wavelength of the main beam;

focusing the main beam by an objective lens and at a region in the complex recording layer where only the first recording layer is formed, and detecting a first focus error signal from the main beam reflected from the complex recording layer, wherein a focal position of the main beam is controlled by using the first focus error signal, and wherein the first focus error signal is detected from a guide beam reflected from a reference layer, the guide beam being focused on the reference layer, and the guide beam having a wavelength that differs from the wavelength of the main beam;

driving the objective lens so that a value of the first focus error signal is at a local minimum, and memorizing a signal for said driving as a first drive signal;

focusing the main beam at a region in the complex recording layer where both the first recording layer and the second recording layer are formed, and detecting a second focus error signal from the main beam reflected from the complex recording layer;

driving the objective lens so that a value of the second focus error signal is at a local minimum, and memorizing a signal for said driving as a second drive signal; and determining a focus offset value based on the first drive signal and the second drive signal, wherein the focus offset value is to be applied when focusing the main beam at the first recording layer or the second recording layer at a region where both the first recording layer and the second recording layer are formed.

5. An information reading method for an optical disc in which a complex recording layer comprising a first recording layer and a second recording layer volume recording by aligning recording tracks, which hold information, at two depth positions that are separated in a depth direction by a depth offset greater than one-sixth (⅙) of a wavelength of a main beam used for reading, the information reading method comprising:

dividing the main beam emitted from a light source into a first beam and a second beam, and focusing the first beam at a desired recording layer; and reading information recorded on the desired recording layer by causing the first beam reflected from the desired recording layer to optically interfere, at a photodetector, with the second beam reflected by a reflecting mirror and obtaining a read signal;

wherein the depth offset is less than one-quarter (¼) of a spacing between two complex recording layers that are adjacent in the depth direction.

6. An information reading method for an optical disc in which a complex recording layer comprising a first recording layer and a second recording layer volume recording by aligning recording tracks, which hold information, at two depth positions that are separated in a depth direction by a depth offset greater than one-sixth (⅙) of a wavelength of a main beam used for reading, the information reading method comprising:

dividing the main beam emitted from a light source into a first beam and a second beam, and focusing the first beam at a desired recording layer; and reading information recorded on the desired recording layer by causing the first beam reflected from the desired recording layer to optically interfere, at a photodetector, with the second beam reflected by a reflecting mirror and obtaining a read signal;

wherein the optical disc comprises a reference layer comprising a groove, the information reading method further comprising:

focusing, on the reference layer, a guide beam having a wavelength that differs from the wavelength of the main beam, and detecting a first focus error signal from the guide beam reflected from the reference layer;

controlling a focal position of the main beam, by using the first focus error signal;

focusing the main beam at a region in the complex recording layer where only the first recording layer is formed, and detecting a second focus error signal from the main beam reflected from the complex recording layer;

adjusting the focal position of the main beam to a first adjustment value, so that a value of the second focus error signal is at a local minimum;

focusing the main beam at a region in the complex recording layer where both the first recording layer and the second recording layer are formed, and detecting a third focus error signal from the main beam reflected from the complex recording layer;

adjusting the focal position of the main beam to a second adjustment value, so that a value of the third focus error signal is at a local minimum;

calculating an adjustment value for a focal position for focusing the main beam at the second recording layer from the first adjustment value and the second adjustment value;

setting the focal position of the main beam to the calculated adjustment value; and reading information recorded on the second recording layer.

7. An information reading method for an optical disc in which a complex recording layer comprising a first recording layer and a second recording layer volume recording by aligning recording tracks, which hold information, at two depth positions that are separated in a depth direction by a depth offset greater than one-sixth (⅙) of a wavelength of a main beam used for reading, the information reading method comprising:

dividing the main beam emitted from a light source into a first beam and a second beam, and focusing the first beam at a desired recording layer;

reading information recorded on the desired recording layer by causing the first beam reflected from the desired recording layer to optically interfere, at a photodetector, with the second beam reflected by a reflecting mirror and obtaining a read signal;

focusing the main beam by an objective lens and at a region in the complex recording layer where only the first recording layer is formed, and detecting a first focus error signal from the main beam reflected from the complex recording layer;

driving the objective lens so that a value of the first focus error signal is at a local minimum, and memorizing a signal for said driving as a first drive signal;

focusing the main beam at a region in the complex recording layer where both the first recording layer and the second recording layer are formed, and detecting a second focus error signal from the main beam reflected from the complex recording layer;

driving the objective lens so that a value of the value of the second focus error signal is at a local minimum, and memorizing a signal for said driving as a second drive signal; and determining a focus offset value based on the first drive signal and the second drive signal, wherein the focus offset value is applied to the main beam when reading the first recording layer or the second recording layer at a region where both the first recording layer and the second recording layer are formed.

* * * * *